United States Patent
Chiba et al.

(10) Patent No.: US 9,923,623 B2
(45) Date of Patent: Mar. 20, 2018

(54) RELAY STATION, CONTROL METHOD, AND COMMUNICATION SYSTEM

(71) Applicant: FUJITSU LIMITED, Kawasaki-shi, Kanagawa (JP)

(72) Inventors: Katsuhiko Chiba, Yokohama (JP); Akira Hirata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 140 days.

(21) Appl. No.: 14/844,635

(22) Filed: Sep. 3, 2015

(65) Prior Publication Data
US 2015/0381260 A1  Dec. 31, 2015

Related U.S. Application Data

(63) Continuation of application No. PCT/JP2013/058741, filed on Mar. 26, 2013.

(51) Int. Cl.
*H04B 7/155* (2006.01)
*H04W 8/26* (2009.01)
(Continued)

(52) U.S. Cl.
CPC .......... *H04B 7/15542* (2013.01); *H04W 8/26* (2013.01); *H04W 76/021* (2013.01);
(Continued)

(58) Field of Classification Search
CPC .................................. H04B 7/15542
See application file for complete search history.

(56) References Cited

U.S. PATENT DOCUMENTS

2011/0199937 A1   8/2011  Demarez et al.
2011/0237258 A1   9/2011  Nylander et al.
(Continued)

FOREIGN PATENT DOCUMENTS

JP   2011-97476   5/2011
JP   2011-97543   5/2011
(Continued)

OTHER PUBLICATIONS

3GPP TS36.300 v9.9.0—3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), Dec. 2011 (174 pages).
(Continued)

*Primary Examiner* — Jason E Mattis
(74) *Attorney, Agent, or Firm* — Fujitsu Patent Center

(57) ABSTRACT

A relay station relays communications between a plurality of home base stations and a switching station via communication interfaces. The relay station sets up a switching station side communication interface for each base station group. The switching station side communication interface is a part of a communication interface used by each home base station belonging to the base station group to communicate with the switching station, where the part is between the relay station and the switching station. The base station group includes the home base stations identified by home base station identifiers, each of which has a first data length, having a common upper segment. The upper segment has a second data length shorter than the first data length and being located sequentially from an uppermost position. The second data length is the same as a data length of a macro base station identifier.

12 Claims, 19 Drawing Sheets

(51) Int. Cl.
*H04W 76/02* (2009.01)
*H04W 84/04* (2009.01)
*H04W 88/12* (2009.01)
*H04W 92/14* (2009.01)

(52) U.S. Cl.
CPC .......... *H04W 84/045* (2013.01); *H04W 88/12* (2013.01); *H04W 92/14* (2013.01)

(56) References Cited

U.S. PATENT DOCUMENTS

| | | | | |
|---|---|---|---|---|
| 2012/0039213 | A1* | 2/2012 | Cheng | H04W 76/022 370/254 |
| 2012/0184294 | A1* | 7/2012 | Stojanovski | H04W 48/17 455/456.1 |
| 2012/0230296 | A1* | 9/2012 | Hapsari | H04W 36/0038 370/331 |
| 2013/0003698 | A1* | 1/2013 | Olvera-Hernandez | H04W 8/082 370/331 |
| 2013/0051361 | A1 | 2/2013 | Yokoyama | |
| 2013/0150037 | A1* | 6/2013 | Jha | H04W 36/0005 455/435.1 |
| 2015/0181445 | A1* | 6/2015 | Godin | H04W 76/062 370/254 |
| 2015/0249969 | A1* | 9/2015 | Tamura | H04W 68/02 455/458 |
| 2016/0050591 | A1* | 2/2016 | Israelsson | H04W 36/0061 370/331 |

FOREIGN PATENT DOCUMENTS

| | | |
|---|---|---|
| JP | 2012-44320 | 3/2012 |
| JP | 2013-46312 | 3/2013 |

OTHER PUBLICATIONS

International Search Report and Written Opinion of the International Searching Authority (Form PCT/ISA/210, Form PCT/ISA/237), mailed in connection with PCT/JP2013/058741 and dated Jul. 2, 2013, with partial English translation (8 pages).
Ericsson, "S1-handover routing with HeNB Gateway", 3GPP Draft; R3-082219, 3rd Generation Partnership Project (3GPP), Mobile Competence Center; 650, Route Des Lucioles; F-06921 Sophia-Antipolis Cedex, France, TSG-RAN WG3 #61,vol. RAN WG3, No. Jeju Island; Aug. 13, 2008, Aug. 13, 2008 (Aug. 13, 2008), XP050165260. [cited in EESR mailed on Sep. 26, 2016 for corresponding EP Application No. 13879724.6].
Samsung, "Routing aspects for inbound mobility", 3GPP Draft; R3-091189, 3rd Generation Partnership Project (3GPP), Mobile Competence Center; 650, Route Des Lucioles; F-06921 Sophia-Antipolis Cedex, France, TSG RAN WG3 MTG#64,San Francisco, USA; Apr. 29, 2009, Apr. 29, 2009 (Apr. 29, 2009), XP050341556. [cited in EESR mailed on Sep. 26, 2016 for corresponding EP Application No. 13879724.6].
EESR—The Extended European Search Report dated Sep. 26, 2016 for corresponding European Patent Application No. 13879724.6.
JPOA—Japanese Office Action dated Nov. 29, 2016 for Japanese Patent Application No. 2015-507732, with partial English translation. ** All references cited in the JPOA were previously submitted in the IDS filed on Sep. 3, 2015.
Huawei, "X2 Routing Proxy", 3GPP TSG-RAN WG3#77bis meeting, Lecce, Italy, Oct. 8-12, 2012, R3-122094. <URL:http://www.3gpp.org /ftp/tsg_ran/WG3_lu/TSGR3_77bis/Docs/R3-122094.zip> [Cited in the JPOA].
New Postcom, "Routing of eNB Configuration Transfer message at the MME", 3GPP TSG-RAN WG3 Meeting #70, Jacksonville, USA, Nov. 15-19, 2010, R3-103185. <URL://http://www.3gpp.org/ftp/tsg_ran/WG3_lu/TSGR3_70/Docs/R3-103185.zip> [Cited in the JPOA].
JPOA—Japanese Office Action dated Mar. 14, 2017 for corresponding Japanese Patent Application No. 2015-507732, with machine translation.

* cited by examiner

FIG. 6

| Group ID | TAC | HeNB ID |
|---|---|---|
| #1 "00001" | #1 "A" | #1 "0000101" |
| | | #2 "0000102" |
| | #2 "B" | #3 "0000111" |
| | | #4 "0000112" |
| | | #5 "0000113" |
| #2 "00002" | #3 "C" | #6 "0000221" |
| | | #7 "0000222" |
| | #4 "D" | #8 "0000231" |
| | | #9 "0000232" |
| ⋮ | ⋮ | ⋮ |

FIG. 9

| Message Type |
|---|
| Global eNB ID |
|    PLMN Identity |
|    HeNB ID = "0000341" |
| eNB Name |
| Supported TAs |
|    TAC = "E" |
|    Broadcast PLMNs |
|       PLMN Identity |
| CSG Id List |
|    CSG Id |
| Default paging DRX |

FIG. 10

| Group ID | TAC | HeNB ID |
|---|---|---|
| #1 "00001" | #1 "A" | #1 "0000101" |
| | | #2 "0000102" |
| | #2 "B" | #3 "0000111" |
| | | #4 "0000112" |
| | | #5 "0000113" |
| #2 "00002" | #3 "C" | #6 "0000221" |
| | | #7 "0000222" |
| | #4 "D" | #8 "0000231" |
| | | #9 "0000232" |
| #3 "00003" | #5 "E" | #10 "0000341" |
| ⋮ | ⋮ | ⋮ |

FIG. 11

| Message Type |
|---|
| Global eNB ID |
|    PLMN Identity |
|    eNB ID = "00003" |
| eNB Name |
| Supported TAs |
|    TAC = "E" |
|    Broadcast PLMNs |
|       PLMN Identity |
| CSG Id List |
|    CSG Id |
| Default paging DRX |

FIG. 12

| Message Type |
|---|
| Global eNB ID |
|    PLMN Identity |
|    HeNB ID = "0000251" |
| eNB Name |
| Supported TAs |
|    TAC = "F" |
|       Broadcast PLMNs |
|          PLMN Identity |
| CSG Id List |
|    CSG Id |
| Default paging DRX |

FIG. 13

| Group ID | TAC | HeNB ID |
|---|---|---|
| #1 "00001" | #1 "A" | #1 "0000101" |
| | | #2 "0000102" |
| | #2 "B" | #3 "0000111" |
| | | #4 "0000112" |
| | | #5 "0000113" |
| #2 "00002" | #3 "C" | #6 "0000221" |
| | | #7 "0000222" |
| | #4 "D" | #8 "0000231" |
| | | #9 "0000232" |
| | #6 "F" | #11 "0000251" |
| ⋮ | ⋮ | ⋮ |

FIG. 14

| Message Type |
|---|
| eNB Name |
| Supported TAs |
| TAC = "C" |
| Broadcast PLMNs |
| PLMN Identity |
| Supported TAs |
| TAC = "D" |
| Broadcast PLMNs |
| PLMN Identity |
| Supported TAs |
| TAC = "F" |
| Broadcast PLMNs |
| PLMN Identity |
| CSG Id List |
| CSG Id |
| Default paging DRX |

FIG. 15

| Message Type |
|---|
| Global eNB ID |
|    PLMN Identity |
|    HeNB ID = "0000114" |
| eNB Name |
| Supported TAs |
|    TAC = "B" |
|    Broadcast PLMNs |
|       PLMN Identity |
| CSG Id List |
|    CSG Id |
| Default paging DRX |

FIG. 16

| Group ID | TAC | HeNB ID |
|---|---|---|
| #1 "00001" | #1 "A" | #1 "0000101" |
| | | #2 "0000102" |
| | #2 "B" | #3 "0000111" |
| | | #4 "0000112" |
| | | #5 "0000113" |
| | | #12 "0000114" |
| #2 "00002" | #3 "C" | #6 "0000221" |
| | | #7 "0000222" |
| | #4 "D" | #8 "0000231" |
| | | #9 "0000232" |
| ⋮ | ⋮ | ⋮ |

RELAY STATION, CONTROL METHOD, AND COMMUNICATION SYSTEM

CROSS-REFERENCE TO RELATED APPLICATION

This application is a continuation application of International Application PCT/JP2013/058741 filed on Mar. 26, 2013 and designated the U.S., the entire contents of which are incorporated herein by reference.

FIELD

The present invention relates to a relay station, a control method, a control program, and a communication system.

BACKGROUND

A communication system is well-known, which includes a macro base station providing a macro cell, a home base station providing a home cell that is smaller than the macro cell, and a switching station. The macro base station is also referred to as a Macro Evolved Node B (MeNB), for example. The home base station is also referred to as a Home Evolved Node B (HeNB), for example. The switching station is also referred to as a Mobility Management Entity (MME), for example.

A macro base station may provide multiple cells. For this reason, in a communication system as described above, each cell is identified by a pair of a macro base station identifier identifying a macro base station, and a cell identifier identifying a cell provided by that macro base station. One home base station typically provides a single cell. The number of home base stations is assumed to be larger than that of macro base stations. Hence, each home base station is identified by a home base station identifier having a data length longer than that of a macro base station identifier.

Each macro base station sets up a communication interface (e.g., an S1 interface) between a switching station and that macro base station, using its own macro base station identifier. Each home base station sets up a communication interface between a switching station and that home base station, using its own home base station identifier. The switching station and the respective base stations (each of the macro base station and the home base station) execute communications via the communication interfaces that have been set up.

In the meantime, a relay station (e.g., HeNB GW (Gateway)) is well-known, which relays communications between a home base station and a switching station via a communication interface (refer to Patent Document 1 and Non-Patent Document 1, for example).

One of such relay stations sets up switching station side communication interfaces between the relay station and the switching station, wherein the number of switching station side communication interfaces is smaller than the number of home base stations. As used herein, a switching station side communication interface is a part of a communication interface used by a home base station to communicate with a switching station, wherein the part is between a relay station and a switching station.

This configuration is advantageous in that the number of communication interfaces, that are set up between other stations that directly execute communications with the switching station and the switching station, can be reduced, as compared to a configuration where each of multiple home base stations independently sets up respective communication interfaces with the switching station. This contributes to a reduction in the loads on the switching station.

Patent Document 1: Japanese Laid-Open Patent Publication No. 2012-44320

Non-Patent Document 1: 3rd Generation Partnership Project, Evolved Universal Terrestrial Radio Access (E-UTRA) and Evolved Universal Terrestrial Radio Access Network (E-UTRAN); Overall description; Stage 2 (Release 9), 3GPP TS36.300, December 2011, V9.9.0.

As described above, the switching station side communication interface is set up between the switching station and the relay station. The switching station, however, has no information indicating associations between relay stations and home base stations. Therefore, the switching station that attempts to send information to a destination home base station, cannot find (identify) a relay station that relays communications between the destination home base station and the switching station (the relay station that covers the destination home base station, i.e., covering relay station). Accordingly, for example, when the switching station attempts to send an HO Request requesting a home base station identified by a home base station identifier to execute a handover (HO), that HO request may not arrive at the home base station.

This is particularly probable in the situation where a switching station is configured to identify a destination, solely based on the upper segment of a home base station identifier. As used herein, the upper segment is a part of a home base station identifier. The upper segment has the same data length as that of a macro base station identifier and is located sequentially from the uppermost position. In this particular case, since no other stations are identified by the upper segment of the home base station identifier identifying the destination home base station, it is impossible for the switching station to send any information to the covering relay station.

Another probable situation is in that a switching station is configured to have a function to identify a destination relay station from area information (e.g., a Tracking Area Code (TAC)) associated with a destination of information to be sent. As used herein, area information indicates an area of a home base station. Some switching stations, however, do not have this function. It is impossible for such switching stations to send any information to the covering relay station.

As described above, in the above-described relay station, information may not be conveyed in a reliable manner from a switching station to a home base station.

SUMMARY

According to an aspect of the embodiments, a relay station relays communications between a plurality of home base stations providing respective home cells and a switching station via communication interfaces.

The relay station is configured to set up a switching station side communication interface for each base station group. The switching station side communication interface is a part of a communication interface used by each home base station belonging to the base station group to communicate with the switching station, where the part is between the relay station and the switching station. The base station group includes the home base stations identified by home base station identifiers, each of which has a first data length and is used to identify a home base station, having a common upper segment. The upper segment has a second data length shorter than the first data length and is located sequentially from an uppermost position. The second data length is the same as a data length of a macro base station identifier identifying a macro base station providing a macro cell larger than a home cell.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates one example of a table stored by relay stations as one example of the first embodiment, where Group IDs, TACs, and HeNB IDs are associated with each other;

FIG. 9 is a conceptual diagram schematically illustrating one example of a primary setup request received by a relay station as one example of the first embodiment;

FIG. 10 illustrates one example of a table stored by relay stations as one example of the first embodiment, where Group IDs, TACs, and HeNB IDs are associated with each other;

FIG. 11 is a conceptual diagram schematically illustrating one example of a secondary setup request sent by a relay station as one example of the first embodiment;

FIG. 12 is a conceptual diagram schematically illustrating one example of a primary setup request received by a relay station as one example of the first embodiment;

FIG. 13 illustrates one example of a table stored by relay stations as one example of the first embodiment, where Group IDs, TACs, and HeNB IDs are associated with each other;

FIG. 14 is a conceptual diagram schematically illustrating one example of an update request sent by a relay station as one example of the first embodiment;

FIG. 15 is a conceptual diagram schematically illustrating one example of a primary setup request received by a relay station as one example of the first embodiment;

FIG. 16 illustrates one example of a table stored by relay stations as one example of the first embodiment, where Group IDs, TACs, and HeNB IDs are associated with each other;

DESCRIPTION OF EMBODIMENTS

Figure 1:
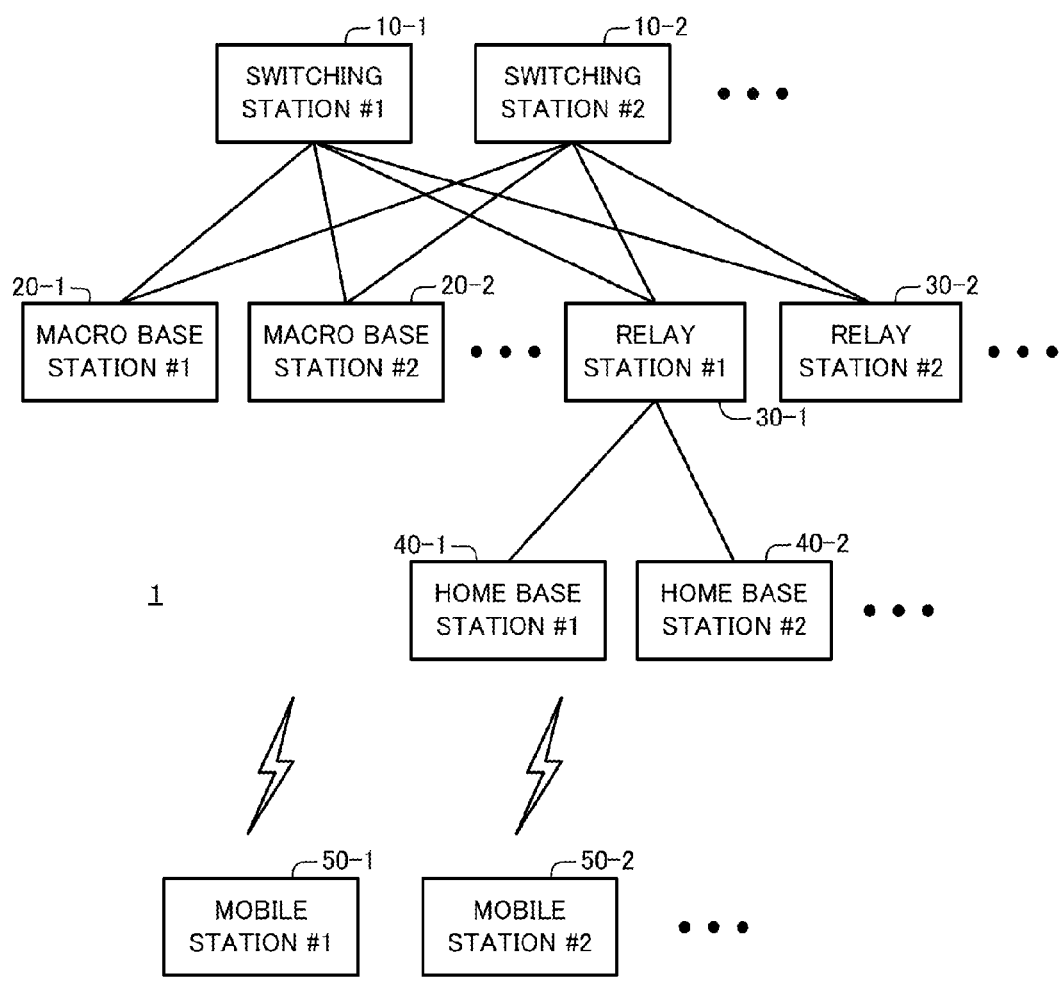
FIG. 1 is a diagram illustrating the configuration of a communication system as one example of a first embodiment.

Embodiments of a relay station, a control method, a control program, and a communication system in accordance with the present invention, for addressing at least one of the issues described above, will be described with reference to FIGS. 1-19.

First Embodiment (Overview)

A communication system in accordance with a first embodiment includes a switching station, a relay station, and a plurality of home base stations. The plurality of home base stations provide respective home cells. The relay station relays communications via communication interfaces between each of the plurality of home base stations and the switching station. The home cells may be referred to as femto cells.

The relay station sets up a switching station side communication interface for each base station group. Each base station group includes home base stations identified by home base station identifiers having a common upper segment. A home base station identifier is information that identifies a home base station and has a first data length. The upper segment has a second data length shorter than the first data length and is located sequentially from an uppermost position (topmost position). Note that the data length may also be referred to as a data volume, a data size, or a bit count.

As used herein, the second data length is the data length of a macro base station identifier identifying a macro base station providing a macro cell larger than a home cell. The switching station side communication interface is a part of a communication interface used by a home base station to communicate with the switching station, where the part is between the relay station and the switching station.

In accordance with the communication system configured as described above, only a single switching station side communication interface is set up for multiple home base stations belonging to a single base station group. Thus, the number of communication interfaces, that are set up between other stations that directly execute communications with a switching station and the switching station, can be reduced, as compared to a configuration where each of multiple home base stations independently sets up respective communication interfaces with the switching station. This contributes to a reduction in the loads on the switching station.

Further, when a switching station attempts to send information, whose destination is a home base station, the switching station can find (identify) a relay station that relays a communication between the home base station and the switching station, based on the upper segment of the home base station identifier identifying that home base station. As a result, a reliable communication of information from a switching station to a home base station can be achieved.

In other words, in accordance with the communication system configured as described above, reliable communications of information can be achieved from a switching station to a home base station, while reducing the loads on the switching station.

Hereinafter, a first embodiment will be described in detail.

(Configuration)

Referring to FIG. 1, a communication system 1 in accordance with the first embodiment includes multiple switching stations 10-1, 10-2, . . . ; multiple macro base stations 20-1, 20-2, . . . ; multiple relay stations 30-1, 30-2, . . . ; multiple home base stations 40-1, 40-2, . . . ; and multiple mobile stations 50-1, 50-2, . . . . Note that the relay stations 30-1, 30-2, . . . , and the home base stations 40-1, 40-2, . . . may also be referred to as base station systems.

Further, hereinafter, the switching stations 10-1 and 10-2 may be denoted as the switching station #1 and switching station #2, respectively. When no distinction among them is to be made, the switching stations 10-1 and 10-2 may be simply denoted as the switching stations 10. Similarly, the macro base stations 20-1 and 20-2 may be denoted as the macro base station #1 and the macro base station #2, respectively. When no distinction among them is to be made, the macro base stations 20-1 and 20-2 may be simply denoted as the macro base stations 20.

Similarly, the relay stations 30-1 and 30-2 may be denoted as the relay station #1 and the relay station #2, respectively. When no distinction among them is to be made, the multiple relay stations 30-1 and 30-2 may be simply denoted as the relay stations 30. Similarly, the home base stations 40-1 and 40-2 may be denoted as the home base station #1 and the home base station #2, respectively. When no distinction among them is to be made, the home base stations 40-1 and 40-2 may be simply denoted as the home base stations 40.

Similarly, the mobile stations 50-1 and 50-2 may be denoted as the mobile station #1 and the mobile station #2, respectively. When no distinction among them is to be made, the mobile stations 50-1 and 50-2 may be simply denoted as the mobile stations 50.

Note that at least one of the number of switching stations 10, the number of macro base stations 20, the number of relay stations 30, and the number of the mobile stations 50 may be one.

The communication system 1 configures a mobile communication system. In this example, the communication system 1 is configured to execute communications in accordance with the Long Term Evolution (LTE). Note that the communication system 1 may be configured to execute communications in accordance with the LTE-Advanced. The communication system 1 may also be configured to execute communications in accordance with the Worldwide Interoperability for Microwave Access (WiMAX).

Note that a switching station 10 is also be referred to as the Mobility Management Entity (MME). A macro base station 20 is also be referred to as the Macro Evolved Node B (MeNB). A relay station 30 is also be referred to as the Home Evolved Node B gateway (HeNB GW). A home base station 40 is also be referred to as the HeNB. A mobile station 50 is also be referred to as the user equipment (UE).

Each of the base stations (each of the MeNBs 20 and the HeNBs 40) is communicatively connected to at least one switching station 10. In this example, each of the base stations 20 and 40 is configured to execute wired communications with the switching station 10. Note that at least one of the base stations 20 and 40 may be configured to execute wireless communications with the switching station 10.

Each HeNB 40 is communicatively connected to one relay station 30. In this example, each HeNB 40 is configured to execute wired communications with the relay station 30. Note that each HeNB 40 may be configured to execute wireless communications with the relay station 30.

Each MeNB 20 sets up a communication interface (an S1 interface, in this example) that is to be used by that MeNB 20 to communicate with the switching station 10. Each MeNB 20 executes communications with the switching station 10 via the communication interface that has been set up.

Each HeNB 40 sets up a communication interface (an S1 interface, in this example) that is to be used by that HeNB 40 to communicate with the switching station 10. Specifically, each HeNB 40 sets up both a base station side communication interface and a switching station side communication interface, which together construct the above-described communication interface.

The base station side communication interface is a part of the communication interface, wherein the part is between a HeNB 40 and a relay station 30 connected to that HeNB 40. The switching station side communication interface is another part of the communication interface, wherein the part is between a relay station 30 and a switching station 10. Each HeNB 40 executes communications with the switching station 10, via the communication interface that has been set up. That is, the relay station 30 relays communications between each of the multiple HeNBs 40 and the switching station 10 via the communication interface.

Each MeNB 20 provides a macro cell. Each MeNB 20 is configured to be wirelessly communicative with mobile stations 50 within a macro cell provided by that MeNB 20. Each MeNB 20 relays communications between the mobile stations 50 and the switching station 10.

Each HeNB 40 provides a home cell that is smaller than the macro cell. Each HeNB 40 is configured to be wirelessly communicative with mobile stations 50 within a home cell provided by the local HeNB 40. Each of the HeNBs 40 and the relay stations 30 relays communications between the mobile stations 50 and the switching station 10.

The communication system 1 executes a handover (HO) processing between a base station 20 or 40 and another base station 20 or 40. In this example, the communication system 1 executes the HO processing between MeNBs 20, between HeNBs 40, and between a MeNB 20 and a HeNB 40. The HO processing is a processing for changing a base station 20 or 40, to which a mobile station 50 connects, in accordance with the change in the communication status between the mobile station 50 and the base station 20 or 40. Note that the communication status may be varied, due to movement of the mobile station 50 or arrival of interference waves, for example.

Figure 2:
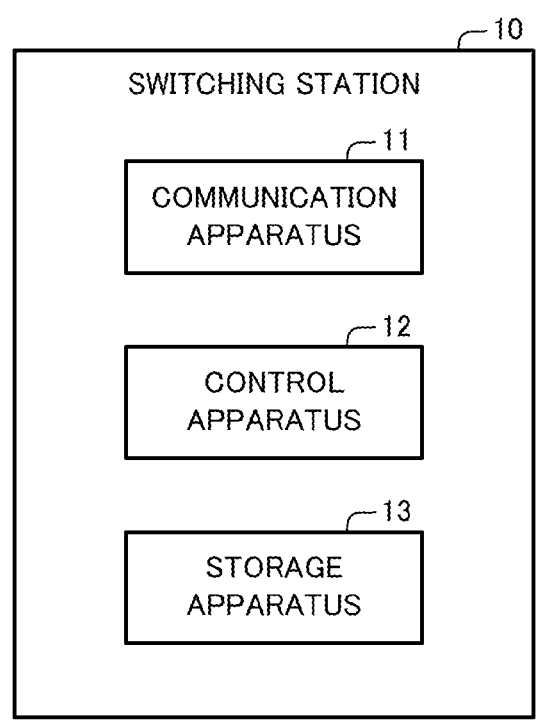
FIG. 2 is a diagram illustrating the configuration of a switching station as one example of the first embodiment.

Referring to FIG. 2, the switching stations 10 includes a communication apparatus 11, a control apparatus 12, and a storage apparatus 13.

The communication apparatus 11 includes a communication port, to which a communication cable can be connected. The communication apparatus 11 executes communications with other stations connected through a communication cable. In this example, the communication apparatus 11 is connected to at least one of the MeNBs 20 and the relay stations 30.

The control apparatus 12 controls components provided in the switching station 10, for embodying functions, as will be described later. In this example, the control apparatus 12 is embodied by a large scale integration (LSI). Note that the control apparatus 12 may also be embodied by a programmable logic device (PLD). The control apparatus 12 may include a processor, such as a central processing unit (CPU), which executes a program stored in the storage apparatus 13 for embodying the functions, as will be described later.

The storage apparatus 13 stores information in a readable and writable manner. For example, the storage apparatus 13 includes at least one of a random access memory (RAM), a read only memory (ROM), a hard disk drive (HDD), a solid state disk (SSD), a semiconductor memory, and an organic memory. Note that the storage apparatus 13 may include a storage medium, such as a flexible disk, an optical disk, an opticalmagneto disk, and a semiconductor memory; and a reader that can read information from the storage medium.

Figure 3:
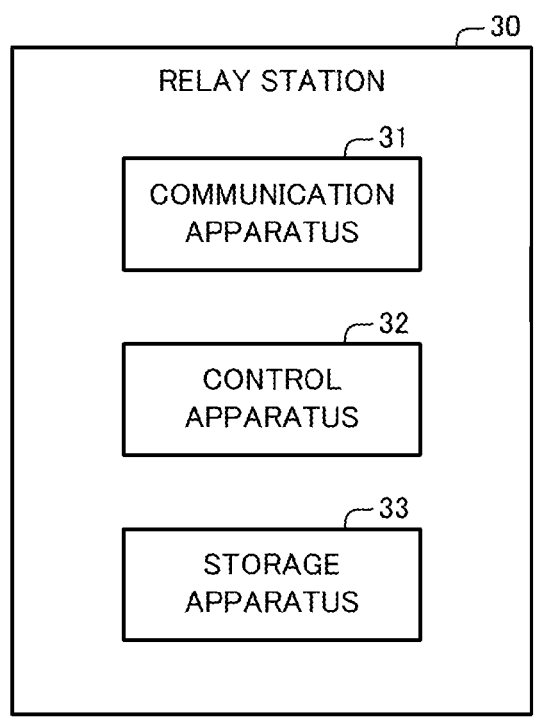
FIG. 3 is a diagram illustrating the configuration of a relay station as one example of the first embodiment.

Referring to FIG. 3, the relay stations 30 includes a communication apparatus 31, a control apparatus 32, and a storage apparatus 33.

The communication apparatus 31 has a configuration similar to that of the communication apparatus 11. In this example, the communication apparatus 31 is connected to at least one of the switching stations 10.

Similarly to the control apparatus 12, the control apparatus 32 controls components provided in the relay station 30, for embodying functions, as will be described later.

The storage apparatus 33 has a configuration similar to that of the storage apparatus 13.

Figure 4:
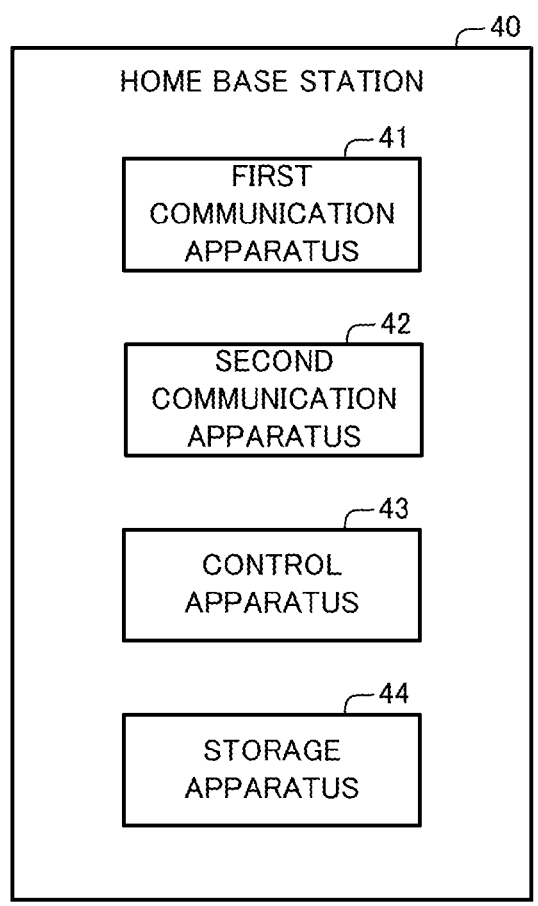
FIG. 4 is a diagram illustrating the configuration of a home base station as one example of the first embodiment.

Referring to FIG. 4, the home base station 40 includes a first communication apparatus 41, a second communication apparatus 42, a control apparatus 43, and a storage apparatus 44.

The first communication apparatus 41 has a configuration similar to that of the communication apparatus 11. In this example, the first communication apparatus 41 is connected to at least one of the relay stations 30.

The second communication apparatus 42 includes an antenna. The second communication apparatus 42 execute wireless communications with mobile stations 50 within a home cell provided by the HeNB 40, through the antenna.

Similarly to the control apparatus 12, the control apparatus 43 controls components provided in the HeNB 40, for embodying functions, as will be described later.

The storage apparatus 44 has a configuration similar to that of the storage apparatus 13.

The MeNB 20 has a configuration similar to that of the HeNBs 40. Note that, in this example, a first communication apparatus provided in the MeNB 20 is connected to at least one of the switching stations 10.

(Functions)

Figure 5:
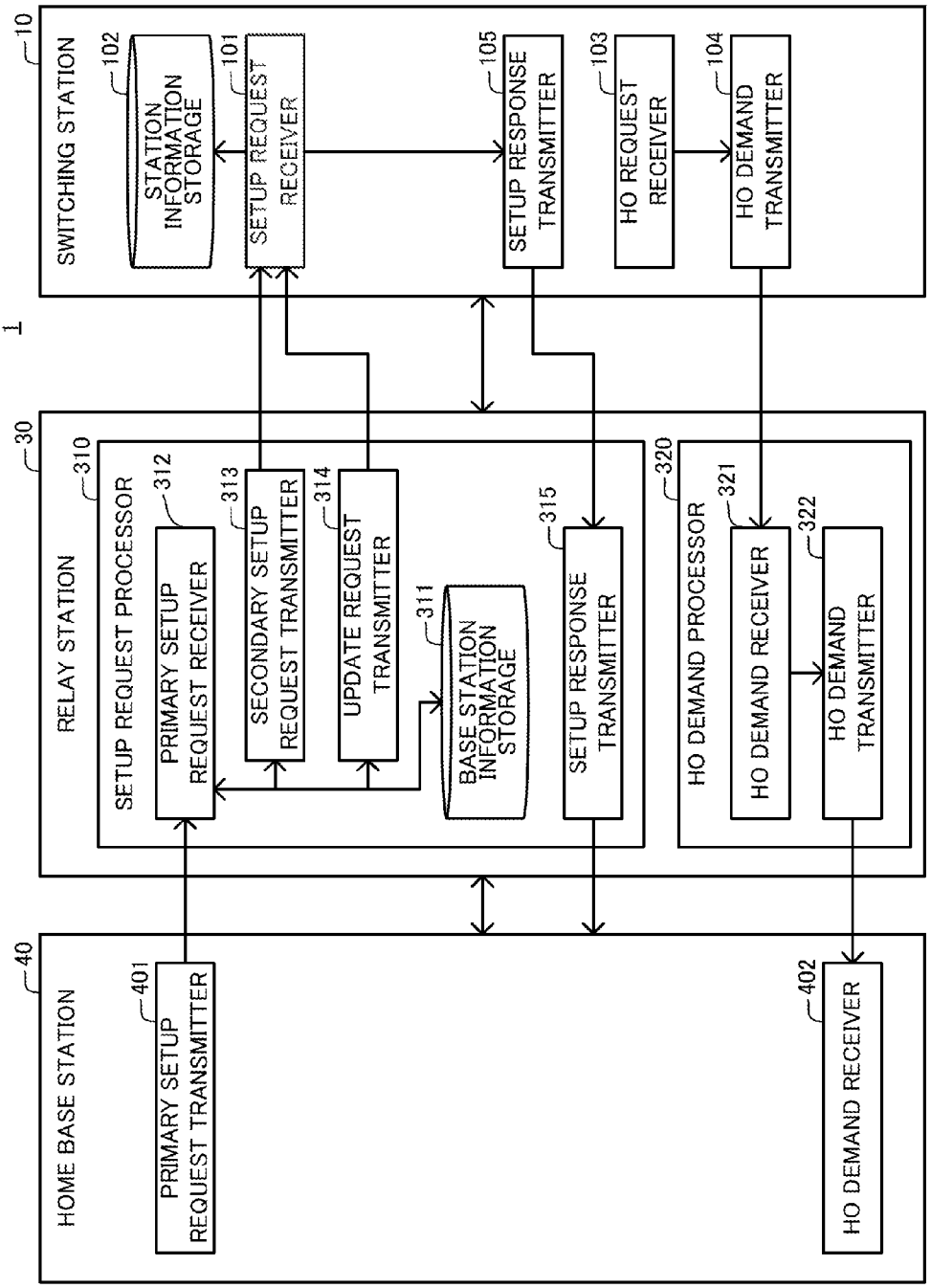
FIG. 5 is a diagram illustrating the function of the communication system as one example of the first embodiment.

Next, referring to FIG. 5, the functions of the communication system 1 will be described.

Functions of a HeNB 40 include a primary setup request transmitter 401 and an HO (Handover) demand receiver 402.

The primary setup request transmitter 401 sends a primary setup request to a relay station 30 connected to the local HeNB 40, at certain transmission timing (in this example, upon a boot up of the HeNB 40).

The primary setup request is an information requesting a processing for setting up a communication interface between a switching station 10 and the local HeNB 40. The primary setup request includes a home base station identifier (HeNB ID) identifying the local HeNB 40, and area information (Tracking Area Code (TAC)) indicating an area assigned to the local HeNB 40. In this example, the primary setup request is an S1 Setup Request message in accordance with the S1 Application Protocol (S1AP).

In this example, the primary setup request transmitter 401 has HeNB IDs and TACs stored in the storage apparatus 44. Note that the HeNB 40 may be configured to update a HeNB ID stored in the storage apparatus 44, when an update request including a HeNB ID is received from a management apparatus. Similarly, the HeNB 40 may be configured to update a TAC stored in the storage apparatus 44, when an update request including a TAC is received from the management apparatus.

In this example, HeNB IDs are set in advance, such that the upper segments of HeNB IDs identifying HeNBs connected to a relay station are different for the respective relay stations. Specifically, HeNB IDs are set such that the upper segment of HeNB IDs identifying HeNBs connected to one relay station is different from any of the upper segments of HeNB IDs identifying HeNBs connected to the other relay stations 30.

Similarly, in this example, TACs are set in advance, such that TACs assigned to HeNBs connected to a relay station are different for the respective relay stations. Specifically, the TAC assigned to HeNBs connected to one relay station 30 is different from any of TACs assigned to HeNBs connected to the other relay stations 30.

The HO demand receiver 402 receives an HO demand from the relay station 30. When the HO demand is received, the HO demand receiver 402 sends an acknowledgement response to the relay station 30 that has sent the HO demand. The HO demand is information demanding execution of an HO processing. In this example, the HO demand is a Handover Request message in accordance with the S1AP. Note that the HO demand may include a TAI containing a TAC indicating an area assigned to a target base station. The acknowledgement response is information responding to the HO demand. In this example, the acknowledgement response is a Handover Request Ack message in accordance with the S1AP.

Note that the primary setup request transmitter 401 is an example of the first communication unit.

Functions of a relay station 30 include a setup request processor 310 and an HO demand processor 320.

The setup request processor 310 includes a base station information storage 311, a primary setup request receiver 312, a secondary setup request transmitter 313, an update request transmitter 314, and a setup response transmitter 315.

As depicted in FIG. 6, the base station information storage 311 stores group identifiers (Group IDs), TACs, and HeNB IDs, in association with each other.

The label '#i' (i represents an integer) indicates that the entry is the $i^{th}$ entry. Double-quoted strings indicate examples of stored information. Note that the labels '#i' are illustrated merely for the purpose of explanation. In this example, therefore, the storage apparatus 33 stores information indicating double-quoted strings, without having the label '#i'. Note that, in this specification, 4-bit information is expressed with a single-digit integer, for the purpose of explanation.

The TAC is area information indicating an area assigned to the HeNB 40.

The HeNB ID is information identifying the HeNB 40. Each HeNB ID has a first data length (28 bits, in this example).

The Group ID is information identifying a group (base station group). Each group is constructed from HeNBs 40 identified by HeNB IDs having a common upper segment. As used herein, an upper segment has a second data length (in this example, 20 bits) that is shorter than the first data length. An upper segment is the segment located sequentially from the uppermost position of a HeNB ID. Note that the second data length is the same as the data length of macro base station identifiers (MeNB IDs) identifying MeNBs 20.

A Group ID is the same information as the upper segment of HeNB IDs identifying HeNBs 40 belonging to a group identified by that Group ID.

In other words, the base station information storage 311 stores a Group ID and HeNB IDs identifying HeNBs 40 belonging to the group identified by the Group ID, in association with each other. The base station information storage 311 also stores a HeNB ID and a TAC indicating an area assigned to the HeNB identified by that HeNB ID, in association with each other.

In other words, the base station information storage 311 stores a HeNB ID, a TAC indicating an area assigned to the HeNB identified by that HeNB ID, and a Group ID that matches the upper segment of the HeNB ID, in association with each other.

The primary setup request receiver 312 receives the primary setup request sent by a HeNB 40 connected to the local relay station 30.

When a certain secondary setup request transmission condition is met, the secondary setup request transmitter 313 sends a secondary setup request to the switching station 10 connected to the local relay station 30. In contrast, when the secondary setup request transmission condition is not met, the secondary setup request transmitter 313 does not send (in other words, refrains from sending) the secondary setup request.

The secondary setup request is information requesting a processing for setting up a switching station side communication interface. The secondary setup request includes the upper segment of the HeNB ID included in the primary setup request that was received, as the MeNB ID identifying the local relay station 30. The secondary setup request also includes the TAC included in the received primary setup request. In this example, the secondary setup request is an S1 Setup Request message in accordance with the S1AP.

The secondary setup request transmission condition is a condition where the upper segment of the HeNB ID included in the primary setup request received by the primary setup request receiver 312 does not match any of Group IDs stored in the base station information storage 311.

Note that such a stored Group ID is an example of a MeNB ID included in at least one of secondary setup requests sent to the switching station 10, for setting up switching station side communication interfaces that have already been set up.

In other words, it can be regarded that the secondary setup request transmitter 313 does not send a secondary setup request to the switching station 10, when the upper segment of the HeNB ID included in the primary setup request matches the MeNB ID included in at least one of secondary setup requests sent to the switching station 10, upon setting up switching station side communication interfaces that have already been set up.

It can be regarded that the relay station 30, having such a configuration, sets up a switching station side communication interface, for each group (base station group), of the communication interface used by each of the HeNBs 40 belonging to that group for communicating with the switching station 10.

When a certain first update request transmission condition and a certain second update request transmission condition are both met, the update request transmitter 314 sends an update request to the switching station 10 connected to the local relay station 30. In contrast, when at least one of the first and second update request transmission conditions is not met, the update request transmitter 314 sends no update request.

The update request includes the TAC included in the primary setup request received by the primary setup request receiver 312, and is information requesting addition of the TAC. In this example, the update request is an eNB Configuration Update message in accordance with the S1AP.

The first update request transmission condition is a condition where the upper segment of the HeNB ID included in the primary setup request received by the primary setup request receiver 312 matches any of Group IDs stored in the base station information storage 311. The second update request transmission condition is a condition where the TAC included in the primary setup request received by the primary setup request receiver 312 does not match any of TACs stored in the base station information storage 311 associated with the Group ID that matches the upper segment of the HeNB ID included in that primary setup request.

When the secondary setup request transmission condition is met (i.e., a secondary setup request is sent), the base station information storage 311 newly stores the HeNB ID included in the primary setup request, the upper segment of this HeNB ID as a Group ID, and the TAC included in that primary setup request, in association with each other.

When both the first and second update request transmission conditions are met (i.e., an update request is sent), the base station information storage 311 newly stores the HeNB ID included in the primary setup request, the upper segment of this HeNB ID as a Group ID, and the TAC included in the primary setup request, in association with each other.

Note that the setup response transmitter 315 will be described later.

The HO demand processor 320 includes an HO demand receiver 321 and an HO demand transmitter 322.

The HO demand receiver 321 receives an HO demand from a switching station 10 connected to the local relay station 30. The HO demand is information that includes the HeNB ID, and requests the HeNB 40 identified by that HeNB ID to execute a handover processing. The HO demand is an example of a processing request. Note that a processing request may be information requesting other processing than the HO processing.

The HO demand transmitter 322 selects, when the HO demand is received by the HO demand receiver 321, the HeNB 40 identified by the HeNB ID included in the received HO demand, as a destination (destination HeNB). The HO demand transmitter 322 sends an HO demand to the selected destination HeNB 40.

Note that the base station information storage 311 is an example of a storage. The primary setup request receiver 312, the secondary setup request transmitter 313, the update request transmitter 314, and the HO demand transmitter 322 together are examples of a communication unit or a second communication unit.

Functions of a switching station 10 include a setup request receiver 101, a station information storage 102, an HO request receiver 103, an HO demand transmitter 104, and a setup response transmitter 105.

The setup request receiver 101 receives a secondary setup request and an update request sent by a relay station 30 connected to the local switching station 10. The setup request receiver 101 also receives a setup request sent by a MeNB 20 connected to the local switching station 10.

The setup request is information requesting a processing for setting up a communication interface between a MeNB 20 and the switching station 10. The setup request includes a MeNB ID identifying the MeNB 20 that is a source of the setup request. The setup request also includes a TAC indicating an area assigned to the MeNB 20 as the source. In this example, the setup request is an S1 Setup Request message in accordance with the S1AP.

The station information storage 102 stores TACs and MeNB IDs, in association with each other.

Specifically, when a setup request is received, the station information storage 102 newly stores a MeNB ID and a TAC included in the setup request, in association with each other. Similarly, when a secondary setup request is received, the station information storage 102 newly stores a MeNB ID and a TAC included in the secondary setup request, in association with each other. Furthermore, when an update request is received, the station information storage 102 newly stores the MeNB ID identifying the relay station 30 that has sent the update request and a TAC included in that update request, in association with each other. Note that the MeNB ID is the MeNB ID included in the secondary setup request that has resulted in setup of the communication interface used to send that update request.

In other words, the station information storage 102 stores a MeNB ID, and a TAC indicating an area assigned to the MeNB 20 identified by this MeNB ID, in association with each other. Further, the station information storage 102 stores a MeNB ID, and TACs indicating areas assigned to the respective HeNBs 40 connected to the relay station 30 identified by this MeNB ID, in association with each other.

The HO request receiver 103 receives an HO request sent by a MeNB 20 or a HeNB 40. The HO request is information requesting execution of an HO processing. The HO request includes a base station identifier (eNB ID) identifying a base station (target base station) to which a connection with a mobile station 50 is to be handed over (the handover destination). Note that the HO request may include a Tracking Area Identity (TAI) that contains a TAC indicating an area assigned to the target base station.

When the target base station is a MeNB 20, the eNB ID is a MeNB ID having a second data length (20 bits, in this example). Otherwise, when the target base station is a HeNB 40, the eNB ID is a HeNB ID having a first data length (28 bits, in this example). In this example, the HO request is a Handover Required message in accordance with the S1AP.

The HO demand transmitter 104 determines, when the HO request is received by the HO request receiver 103, a remote station (destination station) of a destination based on an eNB ID included in the received HO request. Specifically, the HO demand transmitter 104 obtains the upper segment of the eNB ID, as determination basis information, regardless of whether the eNB ID is a HeNB ID or MeNB ID. This means that the determination basis information has the second data length.

In other words, when the eNB ID is a MeNB ID, the HO demand transmitter 104 obtains the entire eNB ID, as the determination basis information. In contrast, when the eNB ID is a HeNB ID, the HO demand transmitter 104 obtains the upper segment of the eNB ID, as the determination basis information.

The HO demand transmitter 104 then selects the MeNB 20 or the relay station 30 identified by the obtained determination basis information, as the destination station. The HO demand transmitter 104 sends a HO demand including the eNB ID included in the received HO request, to the selected destination station.

When the setup request is received by the setup request receiver 101, the setup response transmitter 105 sends a setup response to the MeNB 20 that has sent the setup request. The setup response is information responding to the setup request. In this example, the setup response is an S1 Setup Response message in accordance with the S1AP. In this example, when the setup response is received by the MeNB 20, a communication interface between the MeNB 20 and the switching station 10 is set up.

Furthermore, when a secondary setup request is received by the setup request receiver 101, the setup response transmitter 105 sends a setup response to the relay station 30 that has sent the secondary setup request. In this example, when the setup response is received by the relay station 30, a switching station side communication interface between the relay station 30 and the switching station 10 is set up.

Furthermore, when an update request is received by the setup request receiver 101, the setup response transmitter 105 sends an acknowledgement response to the relay station 30 that has sent the update request. The acknowledgement response is information responding to the update request. In this example, the acknowledgement response is an eNB Configuration Update Ack message in accordance with the S1AP.

When an acknowledgement response or a setup response is received from the switching station 10 connected to the local relay station 30, the setup response transmitter 315 in the relay station 30 sends a setup response to the HeNB 40 that has sent the primary setup request that has resulted in the received acknowledgement response or setup response. In this example, the setup response that is sent to the HeNB 40 is an S1 Setup Response message in accordance with the S1AP. In this example, when the setup response is received by the HeNB 40, a base station side communication interface between the HeNB 40 and the relay station 30 is set up.

(Operations)

Next, operations of the aforementioned communication system 1 will be described with reference to FIGS. 6-18.

Figure 7:
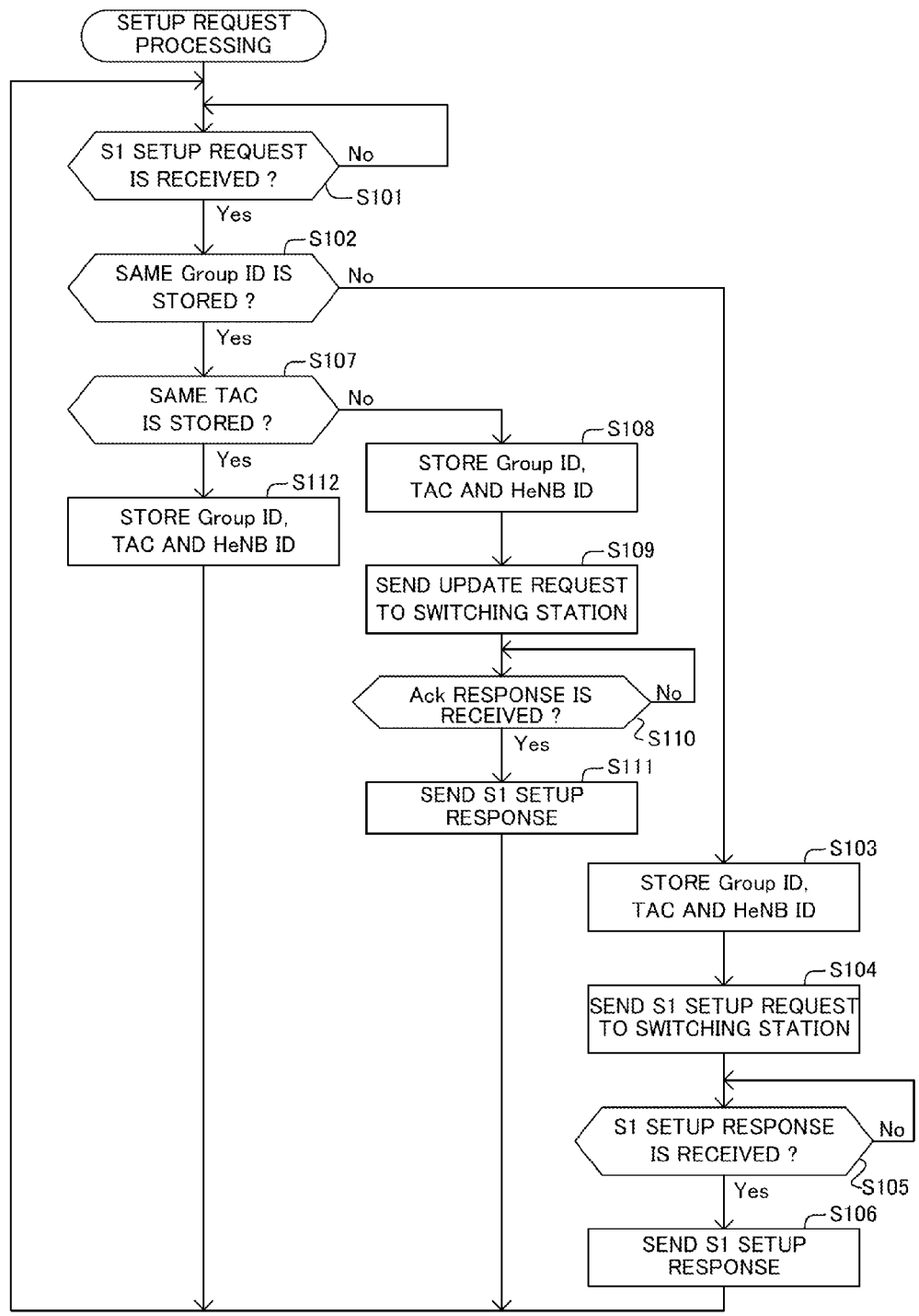
FIG. 7 is a flowchart illustrating a setup request processing, executed by relay stations as one example of the first embodiment.

The relay station 30-1 is adapted to execute a setup request processing depicted in the flowchart in FIG. 7, upon a boot up of the relay station 30-1. Note that the other relay stations 30 operate similarly to the relay station 30-1. Note that the relay station 30-1 may execute the setup request processing, in response to an instruction being entered by a user or an instruction being received from an information processor (not illustrated).

Initially, the relay station 30-1 waits until the relay station 30-1 receives a primary setup request (S1 setup request) from a HeNB 40 (in this example, the HeNB 40-1 or the HeNB 40-2) connected to this relay station 30-1 (Step S101 in FIG. 7).

Figure 8:
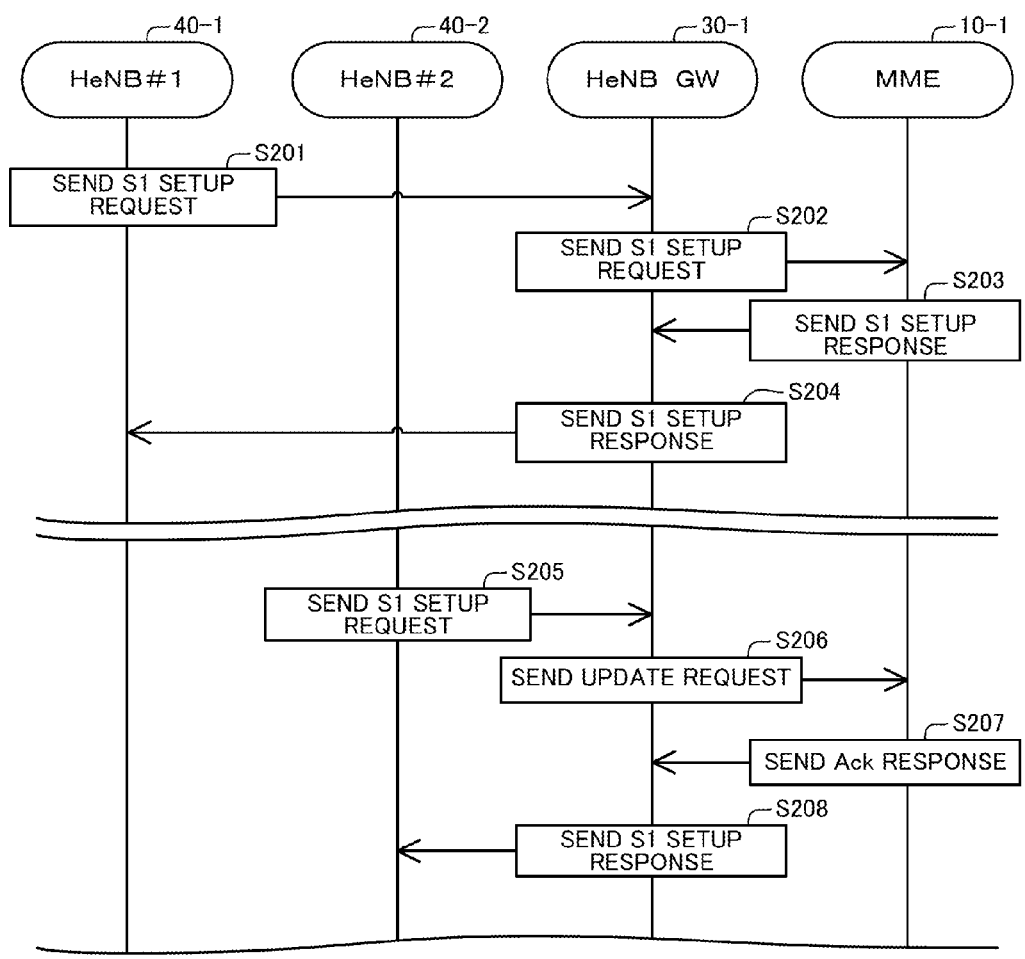
FIG. 8 is a sequence diagram illustrating one example of operations of the communication system as one example of the first embodiment.

In this scenario, it is assumed that the HeNB 40-1 is booted up. In this case, as depicted in FIG. 8, the HeNB 40-1 sends a primary setup request to the relay station 30-1 (Step S201 in FIG. 8). The relay station 30-1, in turn, receives the primary setup request. In response, the relay station 30-1 makes a determination of "Yes" in Step S101 in FIG. 7, and determines whether or not any matching (in other words, the same) Group ID has been stored (Step S102 in FIG. 7).

Specifically, the relay station 30-1 determines whether or not the upper segment of the HeNB ID included in the received primary setup request matches (equals to) any of Group IDs that have been stored.

It is assumed that, as depicted in FIG. 6, the relay station 30-1 has stored Group IDs, TACs, and HeNB IDs, in association with each other, in this example. Further, as depicted in FIG. 9, the received primary setup request includes a HeNB ID "0000341" and a TAC "E".

In other words, in this case, the upper segment ("00003") of the HeNB ID included in the received primary setup request does not match any of Group IDs that have been stored. Further, in this case, the TAC ("E") included in the received primary setup request does not match any of the TACs that have been stored in association with the Group ID that matches the upper segment of the HeNB ID included in that primary setup request.

Therefore, the relay station 30-1 makes a determination of "No" in Step S102 in FIG. 7, and proceeds to Step S103 in FIG. 7. Then, as depicted in FIG. 10, the relay station 30-1 newly stores the HeNB ID ("0000341") included in the received primary setup request, the upper segment ("00003") of this HeNB ID as a Group ID, and the TAC ("E") included in that primary setup request, in association with each other.

The relay station 30-1 then sends a secondary setup request (S1 setup request) to the switching station 10-1 connected to this relay station 30-1 (Step S104 in FIG. 7 and Step S202 in FIG. 8). As depicted in FIG. 11, the secondary setup request includes the upper segment ("00003") of the HeNB ID included in the received primary setup request, as the MeNB ID identifying the relay station 30-1. The secondary setup request also includes the TAC ("E") included in the received primary setup request.

Next, the relay station 30-1 waits until the relay station 30-1 receives a setup response (S1 setup response) from the switching station 10-1 to which the secondary setup request has been sent (Step S105 in FIG. 7).

On the other hand, the switching station 10-1 receives a secondary setup request from the relay station 30-1. The switching station 10-1 then newly stores the MeNB ID and the TAC included in the secondary setup request, in association with each other.

The switching station 10-1 then sends a setup response (S1 setup response) to the relay station 30-1 that has sent the secondary setup request (Step S203 in FIG. 8).

In response, the relay station 30-1 receives a setup response from the switching station 10-1. As a result, a switching station side communication interface between the relay station 30-1 and the switching station 10-1 is set up. Further, the relay station 30-1 makes a determination of "Yes" in Step S105 in FIG. 7, and proceeds to Step S106.

The relay station 30-1 then sends a setup response (S1 setup response) to the HeNB 40-1 that has sent the primary setup request (i.e., the primary setup request received in Step S101 in FIG. 7) that has resulted in the setup response received from the switching station 10-1 (Step S204 in FIG. 8). The HeNB 40-1, in turn, receives a setup response from the relay station 30-1. As a result, a base station side communication interface between the HeNB 40-1 and the relay station 30-1 is set up.

The relay station 30-1 then returns to Step S101 in FIG. 7, and repeats the processing in Steps S101 through S112.

In the next scenario, it is assumed that the HeNB 40-2 is booted up. In this scenario, as depicted in FIG. 8, the HeNB 40-2 sends a primary setup request to the relay station 30-1 (Step S205 in FIG. 8). The relay station 30-1, in turn, receives the primary setup request. Therefore, the relay station 30-1 makes a determination of "Yes", in Step S101 in FIG. 7, and determines whether or not any matching (in other words, the same) Group ID has been stored (Step S102 in FIG. 7).

It is assumed that, as depicted in FIG. 6, the relay station 30-1 has stored Group IDs, TACs, and HeNB IDs, in association with each other, in this example. Further, as depicted in FIG. 12, the received primary setup request includes a HeNB ID "0000251" and a TAC "F".

In other words, in this case, the upper segment ("00002") of the HeNB ID included in the received primary setup request matches at least one of the Group IDs that have been stored. Further, in this case, the TAC ("F") included in the received primary setup request does not match any of the TACs that have been stored in association with the Group ID that matches the upper segment of the HeNB ID included in that primary setup request.

Therefore, the relay station 30-1 makes a determination of "Yes" in Step S102 in FIG. 7, and determines whether or not there is a match with any TAC that has been stored (in other words, the same TAC has been stored) (Step S107 in FIG. 7).

Specifically, the relay station 30-1 determines whether or not the TAC ("F") included in the received primary setup request matches (equals to) any of TACs that have been stored in association with the Group ID that matches the upper segment ("00002") of the HeNB ID included in that primary setup request.

In the above-defined scenario, the relay station 30-1 makes a determination of "No" in Step S107 in FIG. 7, and proceeds to Step S108 in FIG. 7. Then, as depicted in FIG. 13, the relay station 30-1 newly stores the HeNB ID ("0000251") included in the received primary setup request, the upper segment of that HeNB ID ("00002") as a Group ID, and the TAC ("F") included in that primary setup request, in association with each other.

The relay station 30-1 then sends an update request to the switching station 10-1 connected to this relay station 30-1 (Step S109 in FIG. 7 and Step S206 in FIG. 8). As depicted in FIG. 14, this update request includes the upper segment ("00002") of the HeNB ID ("0000251") included in the received primary setup request, and all TACs stored in association with the matching Group ID. In other words, this update request includes the TAC ("F") included in the received primary setup request.

Next, the relay station 30-1 waits until the relay station 30-1 receives an acknowledgement response from the switching station 10-1 to which the update request has been sent (Step S110 in FIG. 7).

On the other hand, the switching station 10-1 receives an update request from the relay station 30-1. The switching station 10-1 then stores the MeNB ID identifying the relay station 30-1 that has sent the update request, and the TAC included in that update request, in association with each other (i.e., it updates the stored TAC associated with the MeNB ID).

The switching station 10-1 then sends an acknowledgement response to the relay station 30-1 that has sent the update request (Step S207 in FIG. 8).

The relay station 30-1, in turn, receives the acknowledgement response from the switching station 10-1. Therefore, the relay station 30-1 makes a determination of "Yes" in Step S110 in FIG. 7, and proceeds to Step S111.

The relay station 30-1 then sends a setup response (S1 setup response) to the HeNB 40-2 that has sent the primary setup request that has resulted in the acknowledgement response received from the switching station 10-1 (i.e., the primary setup request received in Step S101 in FIG. 7) (Step S208 in FIG. 8). The HeNB 40-2, in turn, receives the setup response from the relay station 30-1. As a result, a base station side communication interface between the HeNB 40-2 and the relay station 30-1 is set up.

Thereafter, the relay station 30-1 returns to Step S101 in FIG. 7, and repeats the processing in Steps S101 through S112.

In the next scenario, as depicted in FIG. 15, it is assumed that a received primary setup request includes a HeNB ID "0000114" and a TAC "B".

In other words, in this scenario, the upper segment ("00001") of the HeNB ID included in the received primary setup request matches at least one of the Group IDs that have been stored. Further, in this case, the TAC ("B") included in the received primary setup request matches at least one of the TACs that have been stored in association with the Group ID that matches the upper segment of the HeNB ID included in that primary setup request.

Therefore, the relay station 30-1 makes determinations of "Yes" in Steps S102 and S107 in FIG. 7, and proceeds to Step S112. The relay station 30-1 then newly stores, as depicted in FIG. 16, the HeNB ID ("0000114") included in the received primary setup request, the upper segment ("00001") of this HeNB ID as a Group ID, and the TAC ("B") included in that primary setup request, in association with each other.

Next, the relay station 30-1 returns to Step S101 in FIG. 7 without sending a secondary setup request and an update request, and repeats the processing in Steps S101 through S112.

Figure 17:
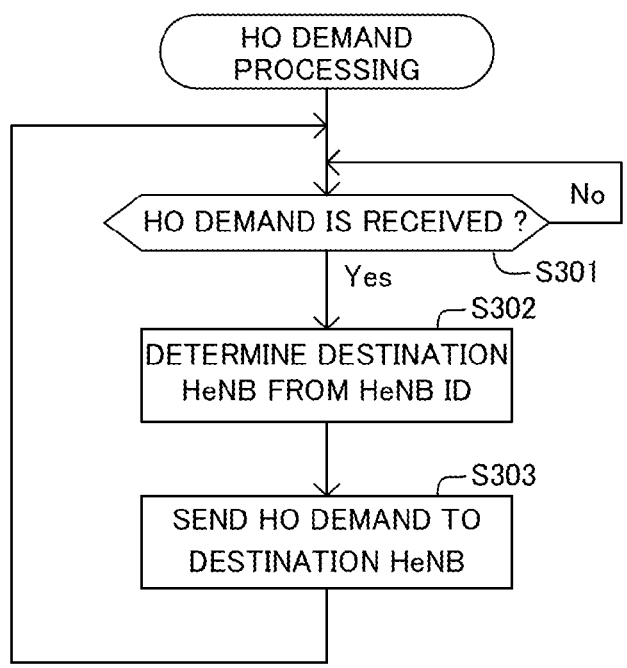
FIG. 17 is a flowchart illustrating an HO demand processing executed by a relay station as one example of the first embodiment.

Furthermore, the relay station 30-1 is adapted to execute an HO demand processing depicted in the flowchart in FIG. 17, upon a boot up of the relay station 30-1. Note that the other relay stations 30 operate similarly to the relay station 30-1. Note that the relay station 30-1 may execute the HO demand processing, in response to an instruction being entered by a user or an instruction being received from an information processor (not illustrated).

Initially, the relay station 30-1 waits until the relay station 30-1 receives an HO demand from a switching station 10 (in this example, the switching station 10-1 or the switching station 10-2) connected to this relay station 30-1 (Step S301 in FIG. 17).

In this case, it is assumed that an HO request is sent, from the MeNB 20-1 as the source base station (Source eNB), to the switching station 10-1, as an example. The HO request includes the HeNB ID identifying the HeNB 40-1, as an eNB ID identifying a base station to which a connection with the mobile station (UE) 50-1 is to be handed over (the handover destination). Note that the base station that is the handover destination is also referred to as the target base station (Target eNB).

Figure 18:
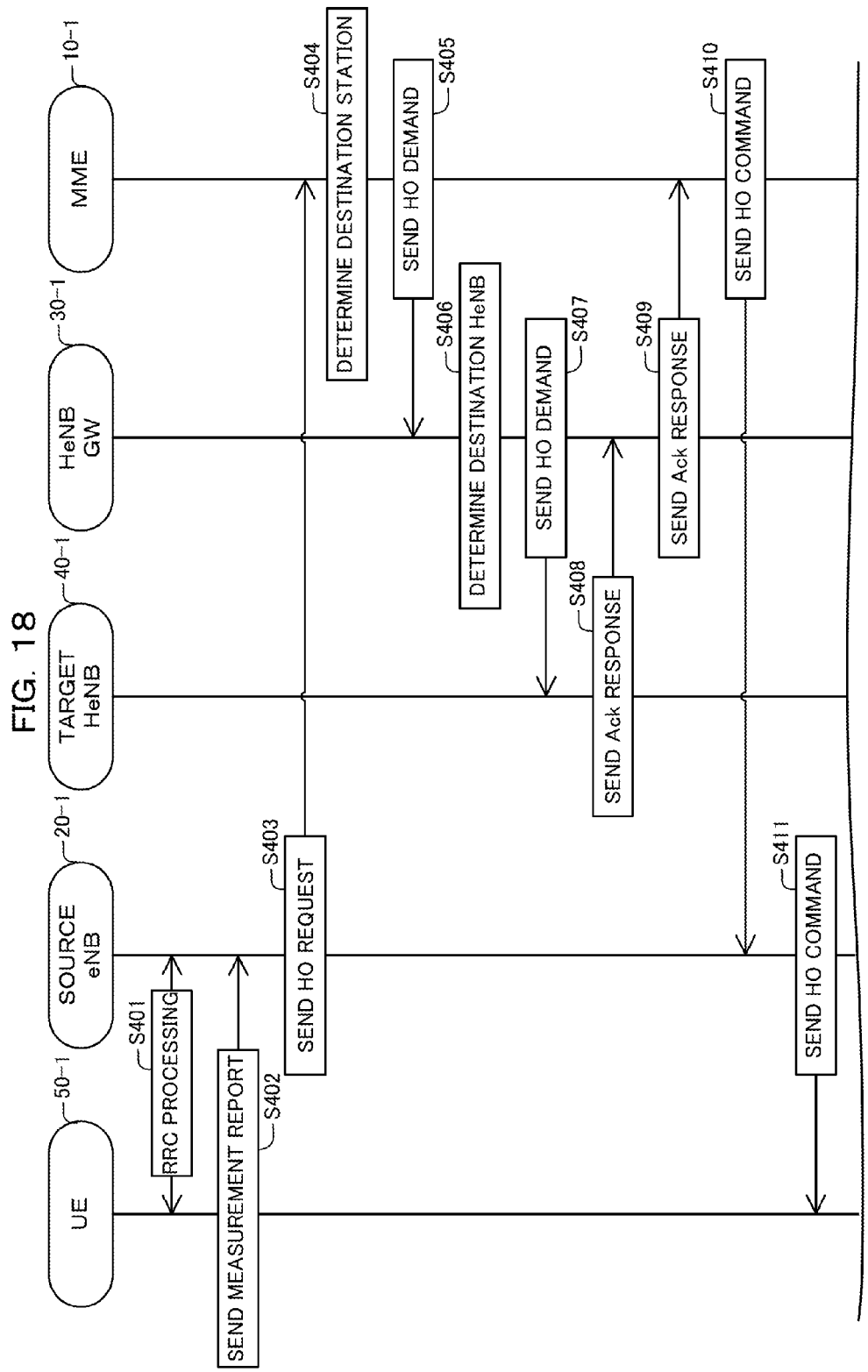
FIG. 18 is a sequence diagram illustrating one example of operations of the communication system as one example of the first embodiment.

Specifically, in this case, initially, as depicted in FIG. 18, an RRC (Radio Resource Control) processing is executed between the mobile station (UE) 50-1 and the MeNB 20-1 (Step S401 in FIG. 18). The RRC processing is a processing in accordance with the RRC protocol.

The mobile station 50-1 then sends a Measurement Report to the MeNB 20-1 to which the mobile station 50-1 connects (in FIG. 18 Step S402). For example, the Measurement Report includes a Cell Global Identity (CGI), a Tracking Area Identity (TAI), a Closed Subscriber Group (CSG) ID, and the like. A CGI includes a MeNB ID or a HeNB ID.

The MeNB 20-1 determines, based on the received Measurement Report, whether a handover processing is to be requested. In the above scenario, the MeNB 20-1 determines that a handover processing is to be requested, specifying the HeNB 40-1 as the handover destination. The MeNB 20-1 then sends an HO request including the HeNB ID identifying the HeNB 40-1 ("0000341" in this example), to the switching station 10-1 (Step S403 in FIG. 18).

The switching station 10-1, in turn, receives the HO request. The switching station 10-1 then selects the relay station 30-1 that is identified by the upper segment ("00003") of the eNB ID ("0000341") included in the received HO request, as the destination station (Step S404 in FIG. 18).

The switching station 10-1 then sends an HO demand including the eNB ID ("0000341") included in the received HO request, to the relay station 30-1 that has been selected as the destination station (Step S405 in FIG. 18).

The relay station 30-1, in turn, receives the HO demand from the switching station 10-1. Therefore, the relay station 30-1 makes a determination of "Yes" in Step S301 in FIG. 17, and selects the destination HeNB, from the eNB ID ("0000341") included in the received HO demand (Step S302 in FIG. 17 and Step S406 in FIG. 18). In this example, the relay station 30-1 selects the HeNB 40-1 as the destination HeNB.

The relay station 30-1 then sends an HO demand to the HeNB 40-1 that has been selected as the destination HeNB (Step S303 in FIG. 17 and Step S407 in FIG. 18). The relay station 30-1 then returns to Step S301 in FIG. 17, and repeats the processing in Steps S301 through S303.

On the other hand, when the HO demand is received from the relay station 30-1, the HeNB 40-1 sends an acknowledgement response to the relay station 30-1 (Step S408 in FIG. 18). Then, when the acknowledgement response is received from the HeNB 40-1, the relay station 30-1 sends an acknowledgement response to the switching station 10-1 (Step S409 in FIG. 18).

When the acknowledgement response is received from the relay station 30-1, the switching station 10-1 then sends the HO command to the MeNB 20-1 that is the source base station (Step S410 in FIG. 18). In this example, the HO command is a Handover Command message in accordance with the S1AP. When the HO command is received from the switching station 10-1, the MeNB 20-1 sends the HO command to the UE 50-1 (Step S411 in FIG. 18).

As described above, the relay stations 30 in accordance with the first embodiment sets up a switching station side communication interface, for each base station group including the home base stations 40 identified by home base station identifiers having a common upper segment among home base station identifiers.

In accordance with this configuration, only a single switching station side communication interface is set up for a plurality of home base stations 40 belonging to a single base station group. Thus, the number of communication interfaces that are set up between other stations that directly execute communications with a switching station 10 and the switching station 10, can be reduced, as compared to a configuration where each of multiple home base stations 40 independently sets up respective communication interfaces with the switching station 10. This contributes to a reduction in the loads on the switching station 10.

Further, when the switching station 10 attempts to send information whose destination is a home base station 40, the switching station 10 can find (identify) the relay station 30 that relays a communication between the destination home base station 40 and the switching station 10, based on the upper segment of the home base station identifier. As a result, a reliable communication of information from the switching station 10 to the home base station 40 can be achieved.

As described above, in accordance with the above-described configuration, a reliable communication of information from a switching station 10 to a home base station 40 can be achieved, while reducing the loads on the switching station 10.

Further, in accordance with the first embodiment, the relay station 30 sends, when a primary setup request is received from a home base station 40, a secondary setup request to the switching station 10. Here, the secondary setup request includes the upper segment of the home base station identifier included in the primary setup request, as a macro base station identifier identifying that relay station 30, and is information requesting a processing for setting up a switching station side communication interface.

In accordance with this configuration, a reliable communication of information from a switching station 10 to a home base station 40 can be achieved, while reducing the loads on the switching station 10.

Additionally, when the upper segment of the home base station identifier included in the received primary setup request matches the macro base station identifier included in at least one of secondary setup requests sent to the switching station 10 upon setting up switching station side communication interfaces that have already been set up, the relay station 30 in accordance with the first embodiment does not send (in other words, refrains from sending) the secondary setup request to the switching station 10.

In accordance with this configuration, a secondary setup request for setting up a switching station side communication interface that has already been set up can be prevented from being sent wastefully.

Further, the relay station 30 in accordance with the first embodiment stores a macro base station identifier included in a secondary setup request that has been sent, and a home base station identifier included in a primary setup request that has resulted in the transmission of the secondary setup request, in association with each other. Further, when the upper segment of the home base station identifier included in the received primary setup request matches any of stored macro base station identifiers, the relay station 30 does not send (in other words, refrains from sending) the secondary setup request to the switching station 10.

Additionally, the relay station 30 in accordance with the first embodiment sends, when both the first and second update request transmission conditions are met, an update request to the switching station 10, without sending a secondary setup request to the switching station 10.

In accordance with this configuration, a secondary setup request for setting up a switching station side communication interface that has already been set up can be prevented from being sent wastefully. Further, even when different areas are assigned to multiple home base stations 40 belonging to a single base station group, area information on those multiple home base stations 40 can be conveyed to the switching station 10.

Further, when a processing request that includes a home base station identifier, and requests a home base station 40 to execute a certain processing is received from a switching station 10, the relay station 30 in accordance with the first embodiment sends that processing request to the home base station 40 identified by that home base station identifier.

In accordance with this configuration, the relay station 30 can convey the processing request to the home base station 40 in a reliable manner. As a result, a reliable communication of a processing request can be achieved from a switching station 10 to a home base station 40.

Note that the communication system 1 in accordance with the first embodiment may be configured to assign at least one Group ID to each of the relay stations 30. In this case, the communication system 1 preferably assigns Group IDs to the relay stations 30 such that a Group ID assigned to one relay station 30 is different from (i.e., does not match) any of Group IDs assigned to the other relay stations 30.

Further, in this case, the relay station 30 preferably sends a secondary setup request or an update request, only when the upper segment of a MeNB ID included in the received primary setup request matches any of Group IDs assigned to that relay station 30.

Furthermore, the communication system 1 in accordance with the first embodiment is configured to store a Group ID, a TAC, and a HeNB ID (Step S103 in FIG. 7) before a secondary setup request is sent (Step S104 in FIG. 7). The communication system 1 may be configured to store a Group ID, a TAC, and a HeNB ID after a secondary setup request is sent.

Furthermore, the communication system 1 in accordance with the first embodiment is configured to store a Group ID, a TAC, and a HeNB ID (Step S103 in FIG. 7) before a secondary setup request is sent (Step S104 in FIG. 7). The communication system 1 may be configured to store a Group ID, a TAC, and a HeNB ID after a secondary setup request is sent. Alternatively, the communication system 1 may be configured to store a Group ID, a TAC, and a HeNB ID after an S1 setup response is received (Step S105 in FIG. 7), or after an S1 setup response is sent (Step S106 in FIG. 7).

Similarly, the communication system 1 in accordance with the first embodiment is configured to store a Group ID, a TAC, and a HeNB ID (Step S108 in FIG. 7) before an update request is sent (Step S109 in FIG. 7). The communication system 1 may be configured to store a Group ID, a TAC, and a HeNB ID after an update request is sent. Alternatively, the communication system 1 may be configured to store a Group ID, a TAC, and a HeNB ID after an acknowledgement response is received (Step S110 in FIG. 7), or after an S1 setup response is sent (Step S111 in FIG. 7).

Furthermore, when a communication interface that has been set up is released (setup of the communication interface is released), the communication system 1 in accordance with the first embodiment may be configured to delete (erase) information (e.g., a Group ID, a TAC, and a HeNB ID, and the like) that has been stored when that communication interface has been set up.

Second Embodiment

Next, a communication system in accordance with a second embodiment of the present invention will be described. The communication system in accordance with the second embodiment is different from the above-described communication system in accordance with the first embodiment, in that a switching station selects a destination station to which an HO demand is to be sent, based on a TAI included in an HO request. Hereinafter, the second embodiment will be described, focusing on this difference. Note that the elements denoted by the same reference symbols are the same as or similar to the corresponding elements in the first embodiment described above.

Figure 19:
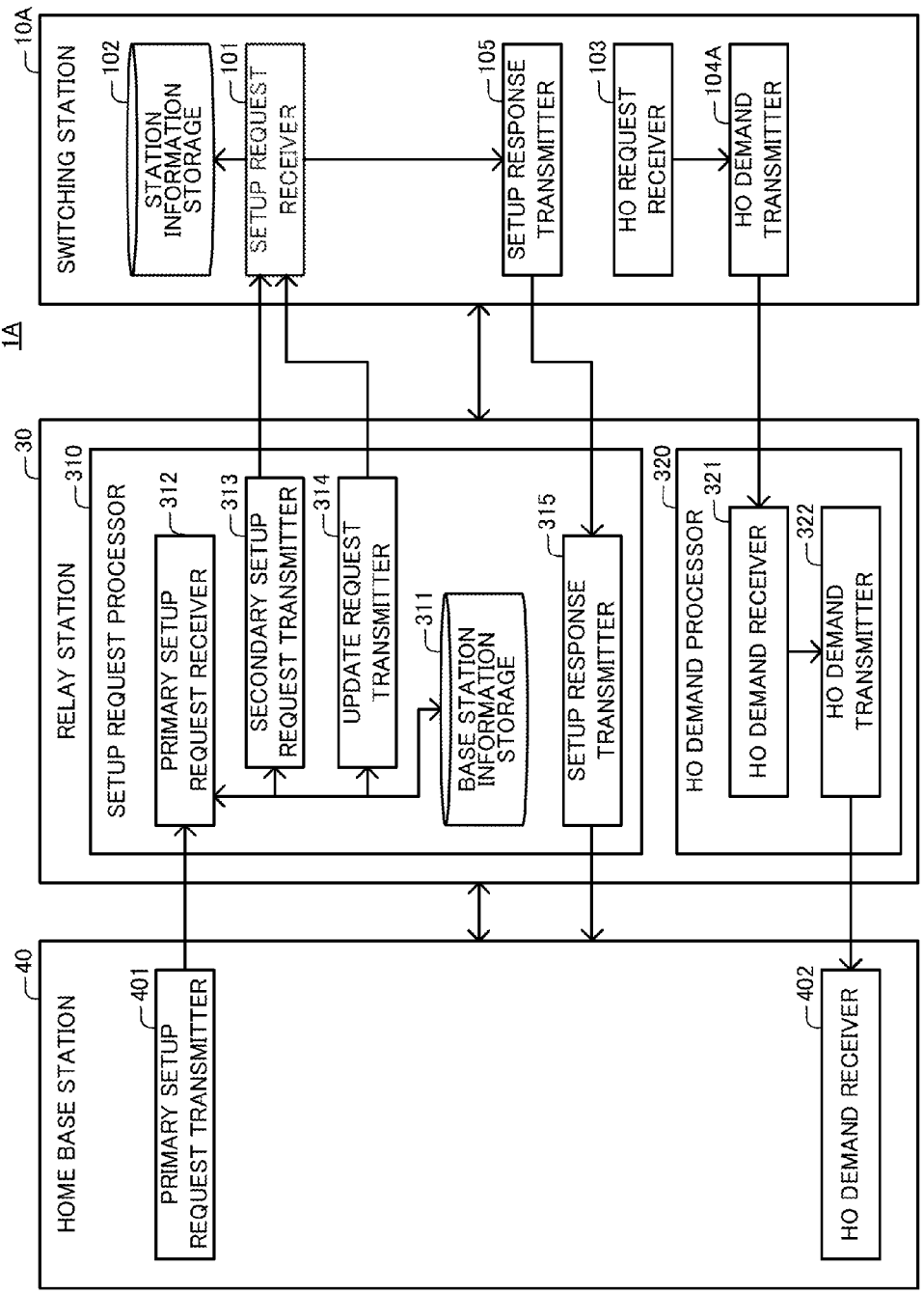
FIG. 19 is a diagram illustrating the function of a communication system as one example of a second embodiment.

Referring to FIG. 19, a communication system 1A in accordance with the second embodiment includes a switching stations 10A, in place of the switching station 10 in accordance with the first embodiment. In the functions of the switching station 10A, the HO demand transmitter 104 in the function of the switching station 10 in accordance with the first embodiment is replaced with an HO demand transmitter 104A. Note that, in this example, an HO request includes a TAI containing a TAC indicating an area assigned to a target base station.

When the HO request is received by the HO request receiver 103, the HO demand transmitter 104A selects a destination remote station (destination station), based on a TAI included in the received HO request. Specifically, the HO demand transmitter 104A selects, as a destination station, a MeNB 20 or a relay station 30 identified by the MeNB ID that is stored in association with the TAC included in the TAI. The HO demand transmitter 104A sends an HO demand including the eNB ID and the TAI included in the received HO request, to the selected destination station.

The communication system 1A configured as described above can have the same advantages and effects as those of the communication system 1 in accordance with the first embodiment.

Although the invention of the present application has been described with reference to the embodiments described above, the invention of the present application is not limited to the above embodiments. Various modifications that are conceivable by those skilled in the art can be made to the configurations and details of the invention of the present application, without departing from the scope of the invention of the present application.

Note that the functions of the respective stations have been embodied by hardware, such as circuits, in the above embodiments. Each of the stations may include a computer including a processor, a storage device that stores a program (software), and the respective functions may be embodied by the processor that executes the program. In such a case, the program may be stored in a computer-readable storage medium. For example, the storage medium may be a portable medium, such as a flexible disk, an optical disk, an opticalmagneto disk, and a semiconductor memory.

Furthermore, any combinations of the above-described embodiments and variations thereof may be employed, without departing from the spirit of the present invention, as other variations to the above-described embodiments.

In accordance with the disclosed relay station, reliable communications of information can be achieved from a switching station to a home base station, while reducing the loads on the switching station.

In accordance with the disclosed relay station, reliable communications of information can be achieved from a switching station to a home base station, while reducing the loads on the switching station.

All examples and conditional language provided herein are intended for pedagogical purposes of aiding the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A relay station that relays communications between a plurality of home base stations providing respective home cells and a switching station via communication interfaces, the relay station configured to set up a switching station side communication interface for each base station group, the switching station side communication interface being a part of a communication interface used by each home base stations belonging to the base station group to communicate with the switching station, the part being between the relay station and the switching station, the base station group including the home base stations identified by home base station identifiers, each of which has a first data length and is used to identify a home base station, having a common upper segment, the upper segment having a second data length shorter than the first data length and being located sequentially from an uppermost position, the second data length being the same as a data length of a macro base station identifier identifying a macro base station providing a macro cell larger than a home cell, wherein the relay station further comprises a communication unit configured to:
receive, from a home base station, a primary setup request that includes a home base station identifier identifying the home base station and that requests a processing for setting up a communication interface between the switching station and the home base station; and
upon receiving the primary setup request, send, to the switching station, a secondary setup request that includes the upper segment of the home base station identifier included in the primary setup request as a macro base station identifier identifying the relay station and that requests a processing for setting up the switching station side communication interface, and wherein the communication unit is configured not to:
send the secondary setup request to the switching station, upon receiving the primary setup request, when the upper segment of the home base station identifier included in the primary setup request matches a macro base station identifier included in at least one secondary setup request that has been sent to the switching station upon setting up a switching station side communication interface that has already been set up.

2. The relay station according to claim 1, further comprising
a storage that stores the macro base station identifier, which is included in the sent secondary setup request, in association with the home base station identifier included in the primary setup request that has resulted in the transmission of the secondary setup request,
wherein the communication unit is configured not to send the secondary setup request to the switching station, upon receiving the primary setup request, when the upper segment of the home base station identifier included in the primary setup request matches the stored macro base station identifier.

3. The relay station according to claim 1, wherein the primary setup request includes area information indicating an area of the home base station,
the secondary setup request includes area information included in the received primary setup request, and
the communication unit is configured to:
upon receiving the primary setup request, when the upper segment of the home base station identifier included in the primary setup request matches a macro base station identifier included in at least one secondary setup request that has been sent to the switching station upon setting up a switching station side communication interface that has already been set up, and when area information included in the secondary setup request does not match area information included in the primary setup request, send, to the switching station, an update request that includes the area information included in the primary setup request and that requests an addition of the area information without sending the secondary setup request to the switching station.

4. The relay station according to claim 1, wherein the communication unit is configured to:
upon receiving, from the switching station, a processing request that includes a home base station identifier identifying a home base station and that requests the home base station to execute a certain processing, send the processing request to the home base station identified by the home base station identifier.

5. A control method of controlling a relay station that relays communications between a plurality of home base stations providing respective home cells and a switching station via communication interfaces, the method comprising:
setting up a switching station side communication interface for each base station group, the switching station side communication interface being a part of a communication interface used by each home base stations belonging to the base station group to communicate with the switching station, the part being between the relay station and the switching station, the base station group including the home base stations identified by home base station identifiers, each of which has a first data length and is used to identify a home base station, having a common upper segment, the upper segment having a second data length shorter than the first data length and being located sequentially from an uppermost position, the second data length being the same as a data length of a macro base station identifier identifying a macro base station providing a macro cell larger than a home cell;
receiving, from a home base station, a primary setup request that includes a home base station identifier identifying the home base station and that requests a processing for setting up a communication interface between the switching station and the home base station;
upon receiving the primary setup request, sending, to the switching station, a secondary setup request that includes the upper segment of the home base station identifier included in the primary setup request as a macro base station identifier identifying the relay station and that requests a processing for setting up the switching station side communication interface; and
sending no secondary setup request to the switching station, upon receiving the primary setup request, when the upper segment of the home base station identifier included in the primary setup request matches a macro base station identifier included in at least one secondary setup request that has been sent to the switching station upon setting up a switching station side communication interface that has already been set up.

6. The control method according to claim 5, further comprising:
storing the macro base station identifier, which is included in the sent secondary setup request, in association with the home base station identifier included in the primary setup request that has resulted in the transmission of the secondary setup request; and
sending no secondary setup request to the switching station, upon receiving the primary setup request, when the upper segment of the home base station identifier included in the primary setup request matches the stored macro base station identifier.

7. The control method according to claim 5, wherein the primary setup request includes area information indicating an area of the home base station,
the secondary setup request includes area information included in the received primary setup request, and
the control method further comprises
upon receiving the primary setup request, when the upper segment of the home base station identifier included in the primary setup request matches a macro base station identifier included in at least one secondary setup request that has been sent to the switching station upon setting up a switching station side communication interface that has already been set up, and when area information included in the secondary setup request does not match area information included in the primary setup request, sending, to the switching station, an update request that includes the area information included in the primary setup request and that requests an addition of the area information without sending the secondary setup request to the switching station.

8. The control method according to claim 5, further comprising
upon receiving, from the switching station, a processing request that includes a home base station identifier identifying a home base station and that requests the home base station to execute a certain processing, sending the processing request to the home base station identified by the home base station identifier.

9. A communication system comprising:
a plurality of home base stations providing respective home cells; and
a relay station that relays communications between the plurality of home base stations and a switching station via communication interfaces,
the communication system configured to set up a switching station side communication interface for each base station group, the switching station side communication interface being a part of a communication interface used by each home base stations belonging to the base station group to communicate with the switching station, the part being between the relay station and the switching station, the base station group including the home base stations identified by home base station identifiers, each of which has a first data length and is used to identify a home base station, having a common upper segment, the upper segment having a second data length shorter than the first data length and being located sequentially from an uppermost position, the second data length being the same as a data length of a macro base station identifier identifying a macro base station providing a macro cell larger than a home cell,
wherein each of the plurality of home base stations comprises a first communication unit that sends a primary setup request that includes a home base station identifier identifying the home base station and that requests a processing for setting up a communication interface between the switching station and the home base station,
wherein the relay station comprises a second communication unit configured to:
receive, from a home base station, the primary setup request; and
upon receiving the primary setup request, send, to the switching station, a secondary setup request that includes the upper segment of the home base station identifier included in the primary setup request as a macro base station identifier identifying the relay station and that requests a processing for setting up the switching station side communication interface, and
wherein the communication unit is configured not to:
send the secondary setup request to the switching station, upon receiving the primary setup request, when the upper segment of the home base station identifier included in the primary setup request matches a macro base station identifier included in at least one secondary setup request that has been sent to the switching station upon setting up a switching station side communication interface that has already been set up.

10. The communication system according to claim 9, wherein the relay station comprises a storage that stores the macro base station identifier, which is included in the sent secondary setup request, in association with the home base station identifier included in the primary setup request that has resulted in the transmission of the secondary setup request, wherein the second communication unit is configured not to send the secondary setup request to the switching station, upon receiving the primary setup request, when the upper segment of the home base station identifier included in the primary setup request matches the stored macro base station identifier.

11. The communication system according to claim 9, wherein the primary setup request includes area information indicating an area of the home base station, the secondary setup request includes area information included in the received primary setup request, and the second communication unit is configured to:

upon receiving the primary setup request, when the upper segment of the home base station identifier included in the primary setup request matches a macro base station identifier included in at least one secondary setup request that has been sent to the switching station upon setting up a switching station side communication interface that has already been set up, and when area information included in the secondary setup request does not match area information included in the primary setup request, send, to the switching station, an update request that includes the area information included in the primary setup request and that requests an addition of the area information without sending the secondary setup request to the switching station.

12. The communication system according to claim 9, wherein the second communication unit is configured to upon receiving, from the switching station, a processing request that includes a home base station identifier identifying a home base station and that requests the home base station to execute a certain processing, send the processing request to the home base station identified by the home base station identifier.

\* \* \* \* \*